(12) United States Patent
Gallegos et al.

(10) Patent No.: US 8,899,845 B2
(45) Date of Patent: Dec. 2, 2014

(54) FIBER OPTIC CONNECTOR (71) Applicant: Panduit Corp., Tinley Park, IL (US)

(72) Inventors: Yuri M. Gallegos, Plainfield, IL (US);
Phillip J. Irwin, Mokena, IL (US);
Jerry A. Wiltjer, Frankfort, IL (US);
Gregory L. Kuffel, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/892,755

(22) Filed: May 13, 2013

(65) Prior Publication Data
US 2014/0205245 A1 Jul. 24, 2014

Related U.S. Application Data (60) Provisional application No. 61/647,292, filed on May 15, 2012.

(51) Int. Cl.
*G02B 6/36* (2006.01)
*G02B 6/38* (2006.01)

(52) U.S. Cl.
CPC ................................ *G02B 6/3826* (2013.01)
USPC .................... 385/81; 385/76; 385/78; 385/87

(58) Field of Classification Search
CPC .. G02B 6/3821; G02B 6/3893; G02B 6/3869;
G02B 6/387; G02B 6/3831; G02B 6/3857;
G02B 6/3877; G02B 6/3874
USPC ............... 385/81, 76–78, 84, 86–87
See application file for complete search history.

(56) References Cited

U.S. PATENT DOCUMENTS

| | | | |
|---|---|---|---|
| 5,101,463 A | 3/1992 | Cubukciyan et al. | |
| 6,017,153 A | 1/2000 | Carlisle et al. | |
| 6,174,190 B1 | 1/2001 | Tharp et al. | |
| 6,322,386 B1 | 11/2001 | Tharp et al. | |
| 6,520,796 B1 | 2/2003 | Reichle | |
| 6,565,262 B2 * | 5/2003 | Childers et al. | 385/76 |
| 6,643,440 B2 * | 11/2003 | Lynch et al. | 385/128 |
| 7,063,554 B2 | 6/2006 | Kuiken et al. | |
| 7,189,008 B2 * | 3/2007 | Dye | 385/78 |
| 7,281,859 B2 | 10/2007 | Mudd et al. | |
| 7,465,180 B2 | 12/2008 | Kusuda et al. | |
| 7,510,335 B1 | 3/2009 | Su et al. | |
| 7,824,205 B2 | 11/2010 | Scislak | |
| 8,025,514 B1 | 9/2011 | Wang | |
| 8,038,456 B1 | 10/2011 | Wang | |
| 8,070,367 B2 | 12/2011 | Winberg et al. | |
| 2003/0077045 A1 | 4/2003 | Fleenor et al. | |
| 2003/0077048 A1 | 4/2003 | Radek et al. | |
| 2005/0213892 A1 * | 9/2005 | Barnes et al. | 385/62 |
| 2007/0147741 A1 * | 6/2007 | Meek et al. | 385/55 |
| 2009/0042424 A1 | 2/2009 | Kaneda | |

(Continued)

*Primary Examiner* — Ellen Kim
(74) *Attorney, Agent, or Firm* — Christopher S. Clancy; Yuri Astvatsaturov (57) ABSTRACT

Embodiments of the present invention are directed to a fiber optic connector and methods of assembly thereof. In one embodiment, the fiber optic connector of the present invention is designed to help decrease the stress placed on an optical fiber during the mating of a connector with a receptacle. In another embodiment, the connector of the present invention terminates onto a polymer coated optical fiber. Other embodiments of the present invention may provide means for simplifying termination of an optical fiber connector onto a fiber and for simplifying disengagement of a fiber optic connector from a corresponding receptacle.

31 Claims, 10 Drawing Sheets

(56) References Cited

U.S. PATENT DOCUMENTS

2009/0304335 A1* 12/2009 Marcouiller et al. ........... 385/78
2010/0284656 A1    11/2010 Morra et al.
2011/0293223 A1* 12/2011 Shimazu et al. ................ 385/81
2012/0002925 A1     1/2012 Nakagawa
2014/0064665 A1*  3/2014 Ott et al. ......................... 385/60

* cited by examiner

FIBER OPTIC CONNECTOR

CROSS-REFERENCE TO RELATED APPLICATIONS

This application claims the benefit of U.S. Provisional Patent Application No. 61/647,292, filed on May 15, 2012, which is incorporated herein by reference in its entirety.

BACKGROUND

The popularity of optical fibers for transmitting data in the communications industry has continued to increase steadily over the years. The ability to employ high data transfer rates and avoid electromagnetic interference makes fiber optic communication especially desirable in certain situations. Similar to other wired networks, fiber optic networks include plugs and receptacles which mate together to allow optical signals to flow therebetween. However, unlike many copper networks, where connectivity between a plug and a receptacle is relatively easy to establish, fiber optic networks require precise junction points between adjoining sections of fiber cables, or between fiber cables and light sensing or light emitting devices. Furthermore, certain kinds of fibers are more susceptible to fracturing or cracking if placed under stress endured during the mating of plugs and receptacles. These and similar concerns are becoming more prevalent as an increasing number of users and installers are finding themselves connecting and disconnecting fiber optic cables with greater frequency.

Therefore, there is a need for an improved fiber optic cable connector.

SUMMARY

Accordingly, embodiments of the present invention are generally directed to fiber optic connectors and methods of assembly thereof.

In one embodiment, the present invention is a fiber optic connector designed to help decrease the stress placed on an optical fiber during the mating of a connector with a receptacle.

In another embodiment, the present invention is an LC style fiber optic connector, standardized as FOCIS 10 (Fiber Optic Connector Intermateability Standards) in EIA/TIA-604-10.

In yet another embodiment, the present invention is a connector that terminates onto a polymer coated fiber (PCF) (also known as a hard clad silica (HCS) fiber).

In still yet another embodiment, the present invention is a connector that terminates onto a fiber that is different from a PCF (e.g., plastic optic fibers).

In still yet another embodiment the present invention is a fiber optic connector comprising a ferrule holder, a backbone, a spring disposed between at least a part of the ferrule holder and at least a part of the backbone, a micro-tube disposed at least partially within the backbone, and a crimp sleeve having a lip, where at least a part of the crimp sleeve is disposed over the backbone. The connector further comprises a first housing including a cavity therein where the ferrule holder is at least partially disposed within the first housing cavity, and a second housing including a top section and a cavity where the backbone is at least partially disposed within the second housing cavity. Where at least a portion of the second housing is disposed over at least a portion of the first housing, and the ferrule holder and the backbone exhibit united lateral movement in relation to the first and second housings.

These and other features, aspects, and advantages of the present invention will become better-understood with reference to the following drawings, description, and any claims that may follow.

DETAILED DESCRIPTION

Figures 1, 2:
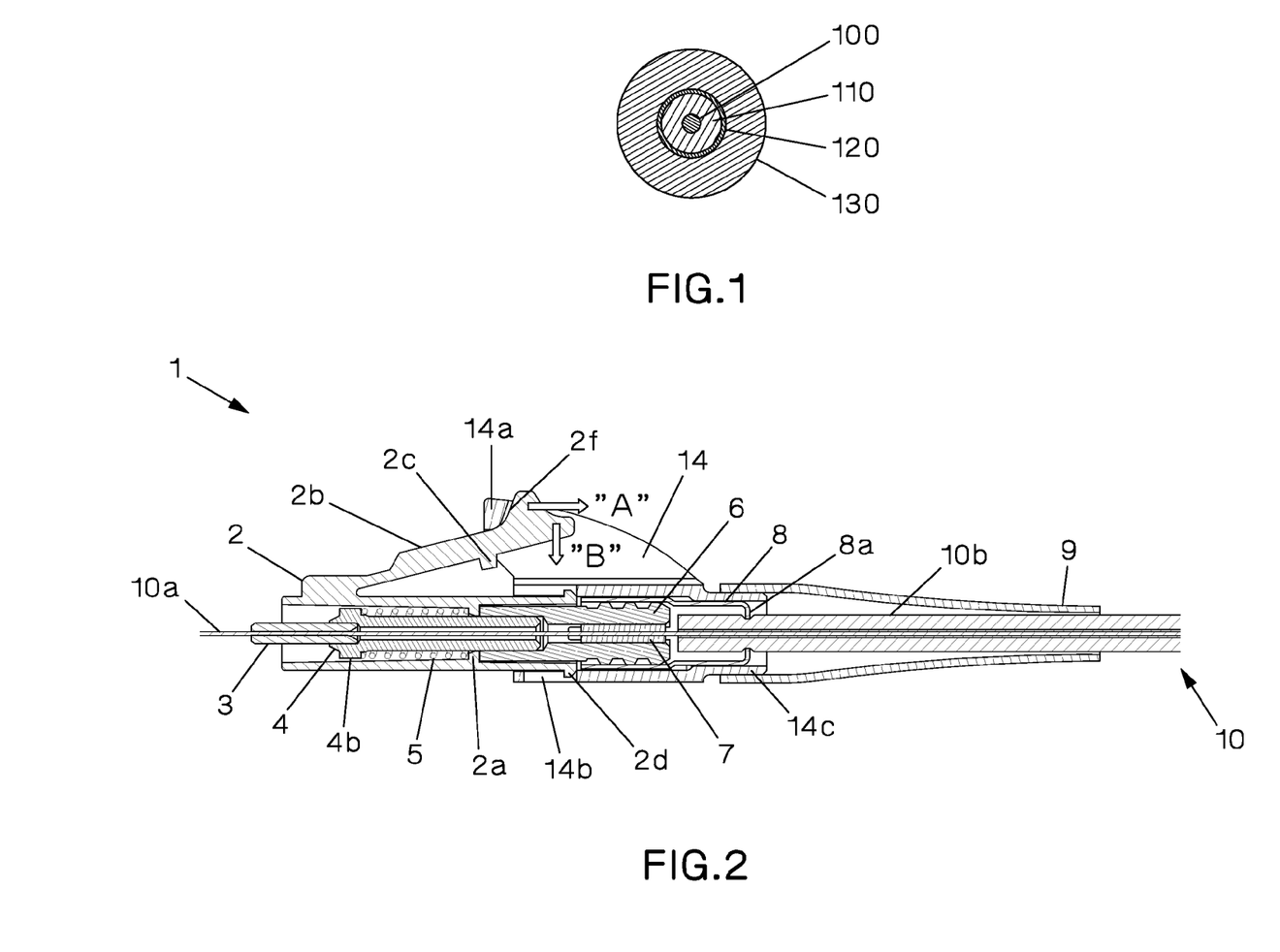
FIG. 1 shows a cross sectional view of one example of a polymer coated optical fiber.
FIG. 2 shows a cross sectional view of a fiber optic connector according to one embodiment of the present invention.

Referring to FIG. 1, a polymer coated fiber (PCF) typically comprises a silica core 100 having a diameter of about 50 µm or about 62.5 µm; a silica cladding 110 covering the silica core 100, where the silica cladding 110 has an outer diameter of about 200 µm; a fluorinated polymer coating 120 covering the silica cladding 110, where the fluorinated polymer coating 120 has an outer diameter of about 230 µm; and an ethylene tetrafluoroethylene (ETFE) buffer 130 covering the fluorinated polymer coating 120, where the ETFE buffer 130 has an outer diameter of about 500 µm. In another embodiment, a PCF comprises a silica core 100 having a diameter of about 200 µm; a fluorinated polymer coating 120 covering the silica core 100, where the fluorinated polymer coating 120 has an outer diameter of about 230 µm; and an ETFE buffer 130 covering the fluorinated polymer coating 120, where the ETFE buffer 130 has an outer diameter of about 500 µm. The silica core 100 can have a graded index or a stepped index. As used herein, the term "fiber" may include any one or more of the core, cladding, and coating.

One embodiment of the present invention is illustrated in FIGS. 2-9. Referring to FIGS. 2 and 3A, the connector 1 comprises a first housing 2, a ferrule 3, a ferrule holder 4 with a holder flange 4b, a spring 5, a backbone 6, a micro-tube 7, a crimp sleeve 8 with a lip 8a, a second housing 14, and a boot 9. The first housing 2 includes a retaining wall 2a, a catch(s) 2d, a connector latch 2b, a tab 2c, and a ramp 2f. The second housing 14 includes a window(s) 14b, a boss 14c, and a follower 14a. In the presently described embodiment, the connector 1 may be considered a push-pull-grip connector.

Figure 3A:
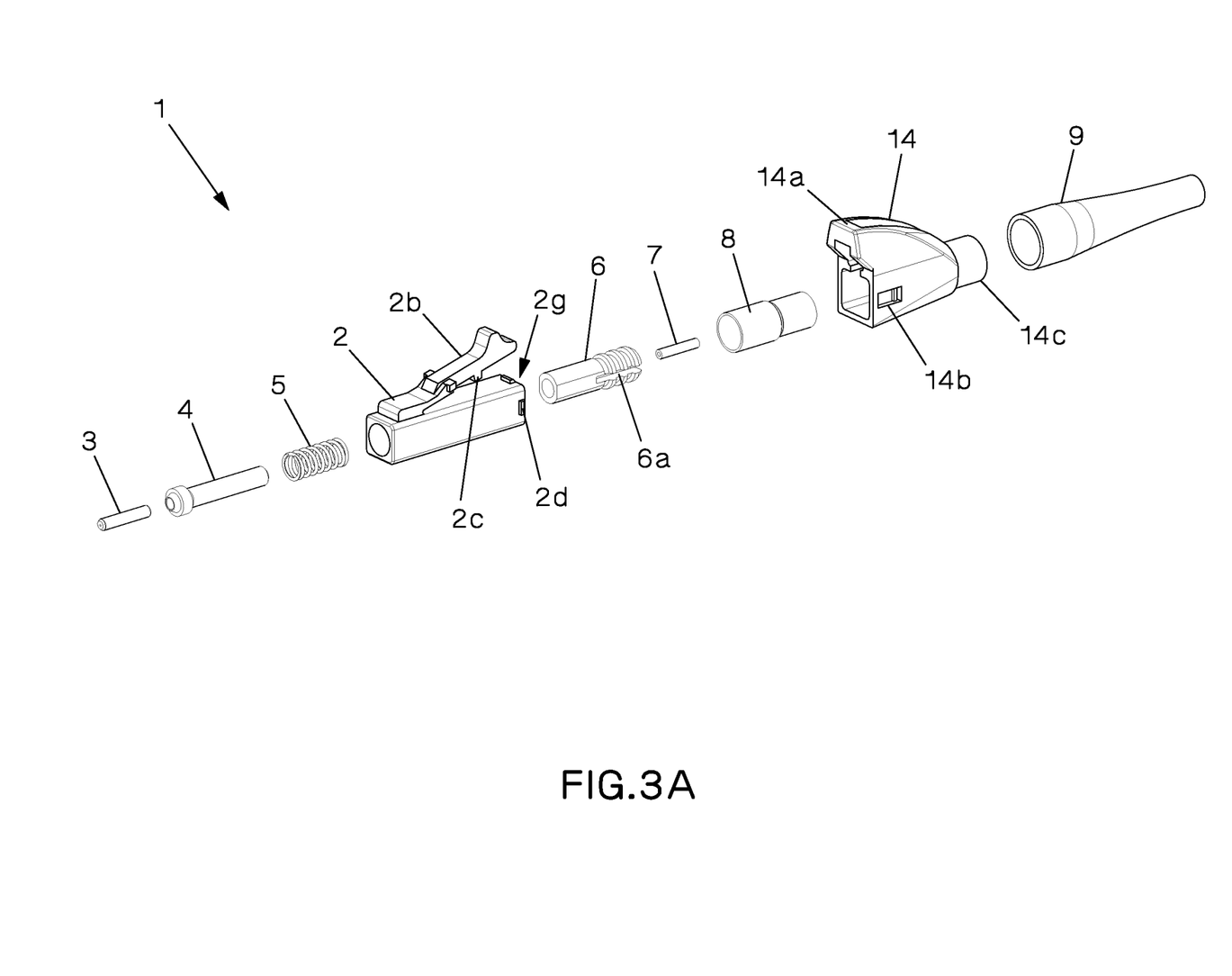
FIG. 3A shows an exploded isometric view of the fiber optic connector of FIG. 2.

Turning to the internal components of the connector 1, the spring 5 is disposed within the internal cavity of the first housing 2 between the ferrule holder flange 4b and the retaining wall 2a of the first housing 2. Such a configuration allows the ferrule holder 4 and the ferrule 3 to be spring loaded, since the ferrule 3 is press-fit into the ferrule holder 4. The ferrule holder 4 is also press-fit into the backbone 6. In other embodiments, other methods for securing the ferrule 3 to the ferrule holder 4 or the ferrule holder 4 to the backbone 6 can be used. Since at least a portion of the backbone 6 abuts one side of the retaining wall 2a and at least a portion of the ferrule-holder flange 4b is repelled by the spring 5 from the opposite side of the retaining wall 2a, the ferrule holder 4 is retained within the first housing 2. The backbone 6 holds a micro-tube 7. In a preferred embodiment, the micro-tube is made of a malleable metal such as aluminum. Other embodiments of the present invention may have the micro-tube 7 made from other malleable material(s) which can provide sufficient frictional retention of the fiber 10a without appreciable damage thereto. Examples of such malleable material(s) include, without limitation, lead and tin.

Figure 3B:
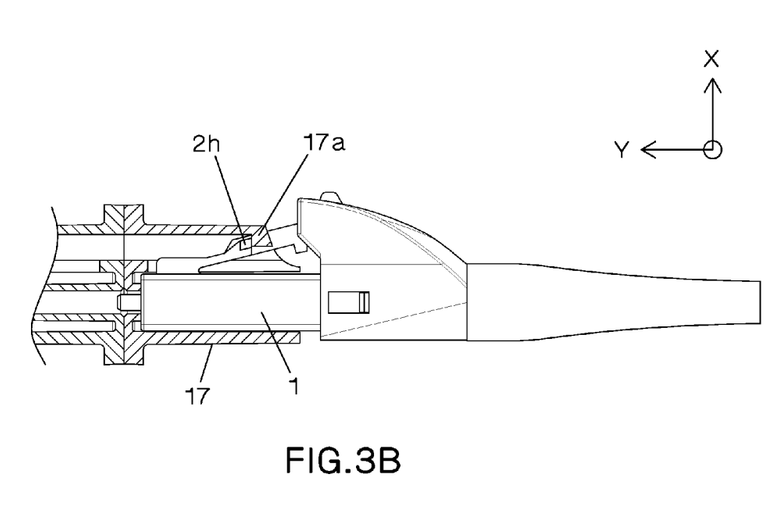
FIG. 3B shows a side view of the fiber optic connector of FIG. 2 installed in a receptacle.
Figure 4:
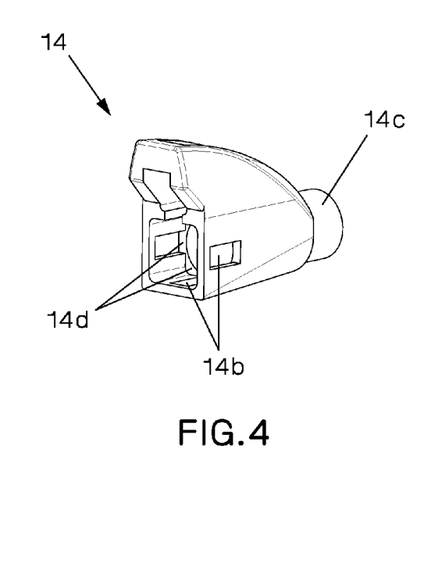
FIG. 4 shows an isometric view of a second housing as used with the fiber optic connector of FIG. 2.
Figure 5:
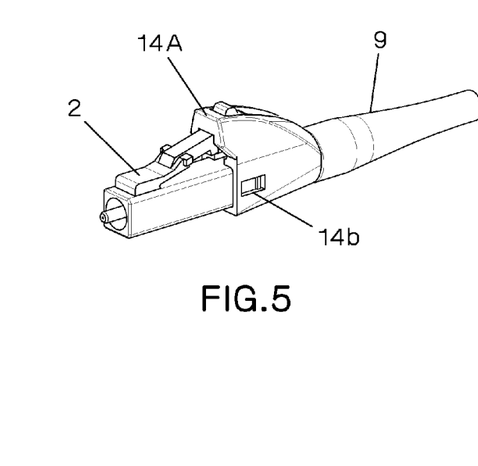
FIG. 5 shows an isometric view of an assembled fiber optic connector of FIG. 2.

For an assembled connector 1 to be latched into an operational position, the first housing 2 is pushed forward into a receptacle 17 of a transceiver/adapter, as illustrated in FIG. 3B. This can be accomplished by applying a forward pushing force (along the Y-axis towards the receptacle 17) on the second housing 14 and/or the boot 9. The forward pushing force causes the internal face 14d of the second housing 14 (see FIG. 4) to come into contact with the back face 2g of the first housing 2 (see FIGS. 3A and 6), and in turn causes the first housing 2 to be pushed in the same general direction as the pushing force. Once the connector is installed in the receptacle, the first housing 2 is retained in position by the latch-hook(s) 2h latching against the lock 17a of the transceiver/adapter. This further allows the second housing 14 to remain in position by having the distal end of the connector latch 2b protrude through an aperture in the top portion of the second housing 14. In other embodiments, the second housing 14 may be retained in position by other known or readily discoverable means. To disengage the connector 1 from its operational position, the second housing 14 and/or the boot 9 is pulled in a generally rearward direction (see arrow "A" in FIG. 2), which results in relative motion between the second housing 14 and the first housing 2 until the follower 14a contacts the ramp 2f, and deflects the connector latch 2b in a generally downward direction (see arrow "B" in FIG. 2). The second housing 14 remains in contact with the first housing 2 by having the window(s) 14b trap the catch(s) 2d located on the first housing 2. The second housing 14 also includes a boss 14c. The boss 14c allows the boot 9 to fit thereover, permitting both the second housing and the boot to move as a single unit (see FIG. 4).

In the presently described embodiment, the housing 2 includes a connector latch 2b (see FIG. 2) with a tab 2c which can prevent the connector latch 2b from deflecting over its stress limit by controlling the distance the latch can be depressed to disconnect from a receptacle.

Figure 9:
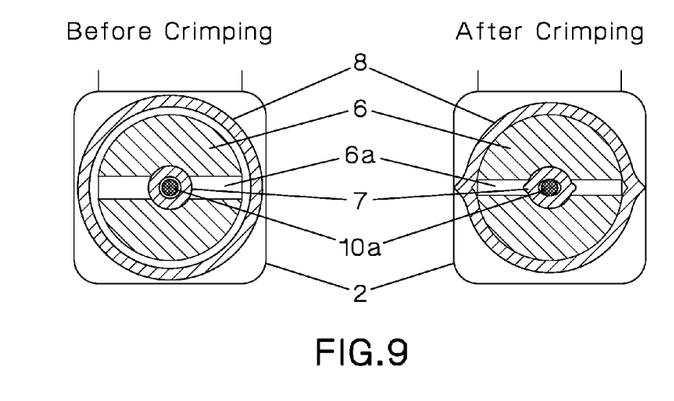
FIG. 9 shows a cross sectional view of the crimp area of the fiber optic connector of FIG. 2 before and after crimping.

To terminate a PCF cable that does not include a strength member using the connector of FIG. 2, the boot 9, the second housing 14, and a crimp sleeve are slid past a stripped or to-be-stripped portion of the PCF cable. Next, a stripped fiber 10a is inserted into the first housing 2 through the micro-tube 7, the backbone 6, the ferrule holder 4, and the ferrule 3 (see FIGS. 6 and 7). Preferably, the stripped fiber 10a is inserted until the non-stripped portion of the fiber cable 10 is in close proximity to or abuts the backbone 6. The crimp sleeve 8 is then positioned over the backbone 6 and the unstripped portion of the fiber cable 10, and crimped via a crimping tool 16, securing the first housing 2 to the fiber cable 10 in the process (see FIG. 8). In an embodiment, the jaws of the crimp tool 16 include half-hexagonal cavities which, when used to crimp the crimp sleeve 8, produce a hexagonal crimp. This may be advantageous because a hexagonal crimp may provide a more even crimping force over the circumference of the backbone 6 when compared to, for example, a two-point top and bottom crimp. As shown in FIG. 9, the slit 6a allows the backbone 6 to compress during crimping and remain in a compressed position. This compression collapses the micro-tube 7 to clamp onto the fiber 10a. Because the fluorinated polymer coating of the fiber is generally harder than the aluminum of the micro-tube 7, the fiber 10a resists breaking. Turning back to FIG. 2, when the crimp sleeve 8 is crimped, the lip 8a will compress and anchor itself to the jacket 10b of the fiber cable 10. This assists with transferring forces placed on the fiber cable 10 to the connector 1 (or vice versa) without placing significant strain on the fiber 10a. Finally, the second housing 14 and the boot 9 are installed over the crimp sleeve 8, causing the second housing 14 to be snapped to the first housing 2. Depending on the length of the boot 9, varying degrees of bend radius control of the fiber-cable 10 can be attained. Once the connector has been installed over the fiber cable 10 and the stripped fiber 10a, the excess fiber extending from the connector's ferrule 3 can be cleaved. Preferably, the fiber 10a is cleaved in close proximity to the end face of ferrule 3 by applying tension to the fiber and scoring it.

The disclosed design of connector 1 may help prevent excessive stress on the fiber 10a. When connector 1 is mated to a receptacle, the tip of the ferrule 3 generally abuts a ferrule-receiving-surface forming adjoining sections of two fiber cables, or of a fiber cable and a light sensing or light emitting device. To ensure a precise junction between these adjoining sections, some pressure is typically exerted against the tip of the ferrule 3 and the cleaved portion of fiber 10a. This pressure can translate into stress along the path of the fiber 10a and potentially cause cracking and/or buckling, resulting in diminished fiber performance or a failure thereof. Since, in the connector of the currently described embodiment, the ferrule 3 is connected to the cable jacket 10b of the cable 10 by a number of rigid components (in particular the ferrule holder 4, the backbone 6, and the crimp sleeve 8), pressure that is exerted on the tip of the ferrule 3 is generally translated to the cable jacket 10b. Furthermore, the micro-tube 7 can help synchronize the movement of the fiber 10a with the remaining internal components of connector 1. Such a configuration may help avoid putting direct pressure and stress on the fiber 10a.

Furthermore, because the internal components of the connector 1 exhibit some degree of generally united lateral movement in relation to the external housings 2 and 14, and the boot 9, the forward pushing force exerted on the second housing 14 or boot 9 during the mating of the connector 1 with a corresponding receptacle does not fully translate to the internal components. This can further help prevent excessive pressure and strain on the fiber 10a.

Prevention of excess stress which can cause buckling and/or cracking may be preferred in an embodiment where the connector 1 is used with a PCF. PCF is generally harder than an all-silica fiber, lending itself to being more brittle if placed under stress.

Figure 10:
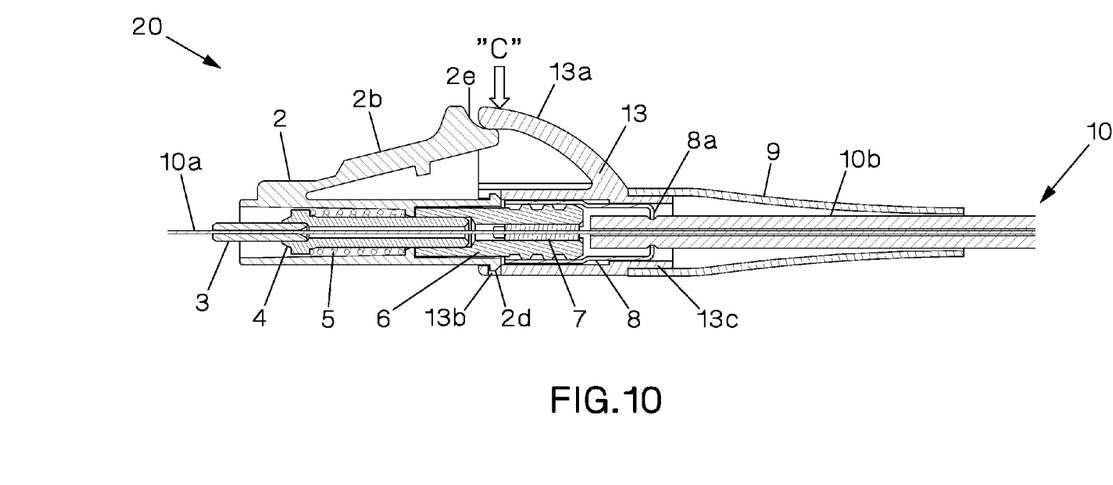
FIG. 10 shows a cross sectional view of a fiber optic connector according to another embodiment of the present invention.
Figure 11:
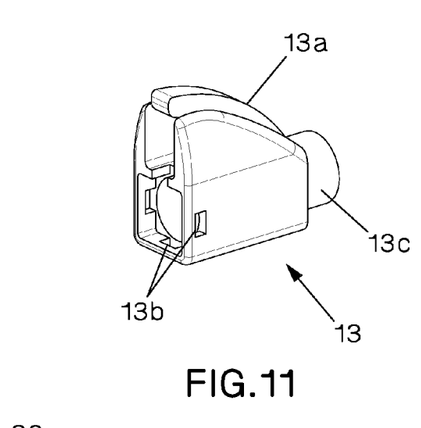
FIG. 11 shows an isometric view of a second housing as used with the fiber optic connector of FIG. 10.
Figure 12:
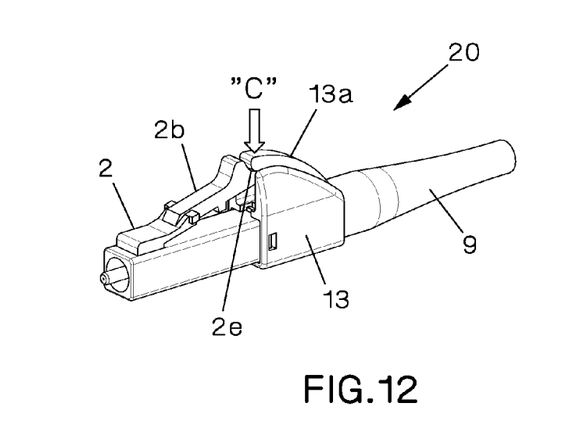
FIG. 12 shows an isometric view of an assembled fiber optic connector of FIG. 10.

FIGS. 10-12 show another embodiment of a connector 20 of the present invention. In this embodiment, the push-pull-grip of the second housing 14 is replaced by an anti-snag-grip 13. The boot 9 is attached to the second housing 13 by pushing it onto the boss 13c. This can provide the benefit of moving the second housing 13 and the boot 9 together with the first housing 2, making it potentially easier to install by pushing either on the boot 9 or the second housing 13. The second housing 13 is secured to the first housing 2 with the catch(es) 2d that fit into the window(s) 13b of the second housing 13. The anti-snag-grip of the second housing 13 can prevent the connector latch 2b from being damaged during handling by deflecting obstacles such as cables over the lever 13a and over the connector latch 2b.

Connector 20 can be latched into an operational position in a receptacle and disengaged from said operational position in a manner that is similar to the previously described embodiment. However, when disengaging the connector 20, the lever 13a is depressed until it pushes down on the pad 2e of the connector latch 2b (see arrow "C" in FIGS. 10 and 12).

Figure 13:
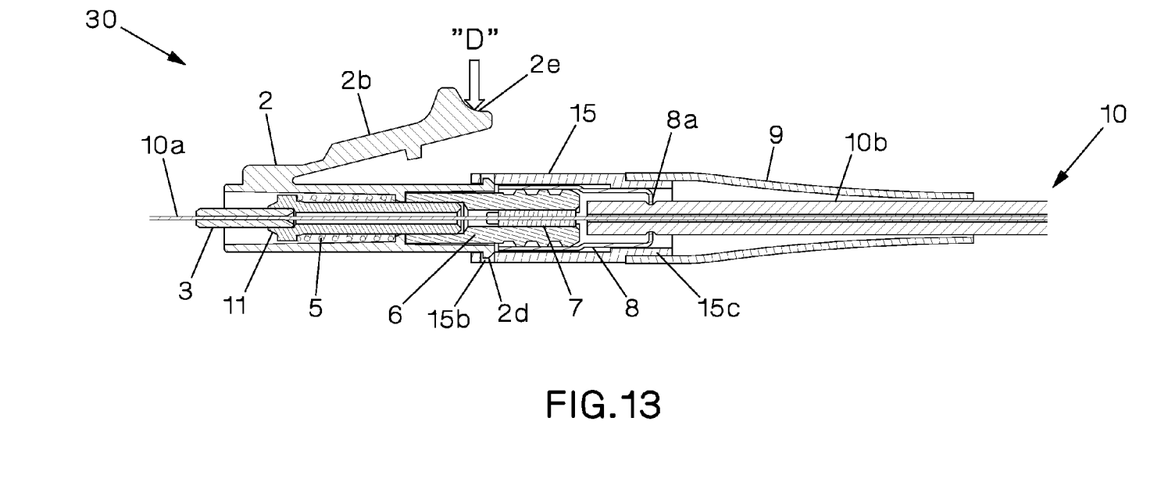
FIG. 13 shows a cross sectional view of a fiber optic connector according to yet another embodiment of the present invention.
Figure 14:
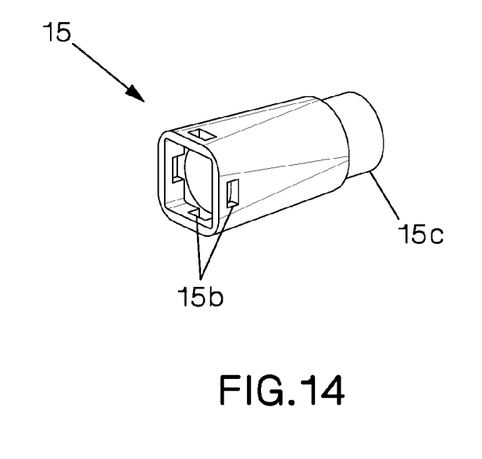
FIG. 14 shows an isometric view of a second housing as used with the fiber optic connector of FIG. 13.
Figure 15:
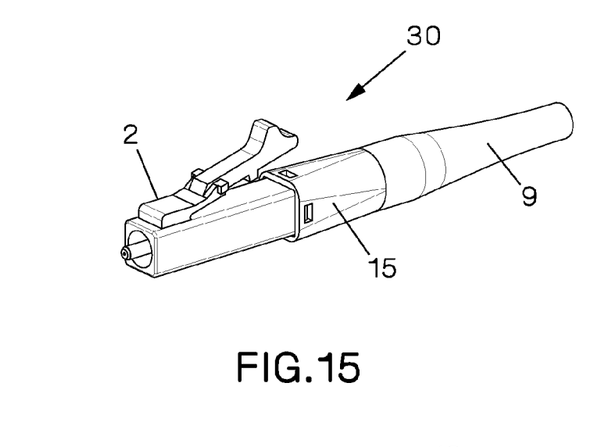
FIG. 15 shows an isometric view of an assembled fiber optic connector of FIG. 13.

In yet another embodiment, shown in FIGS. 13-15, a connector 30 uses a slider for its second housing 15 rather than a push-pull grip or an anti-snag grip. The second housing 15 holds the boot 9 by using the boss 15c. The second housing 15 is secured to the first housing 2 by the catch(es) 2d that fit into the window(s) 15b of the second housing 15. The connector 30 can be latched into an operational position into a receptacle and disengaged from said operational position in a manner that is similar to the previously described embodiment. To disengage the connector 30, the pad 2e of the connector latch 2b is depressed (see arrow "D" in FIG. 13).

Figure 16:
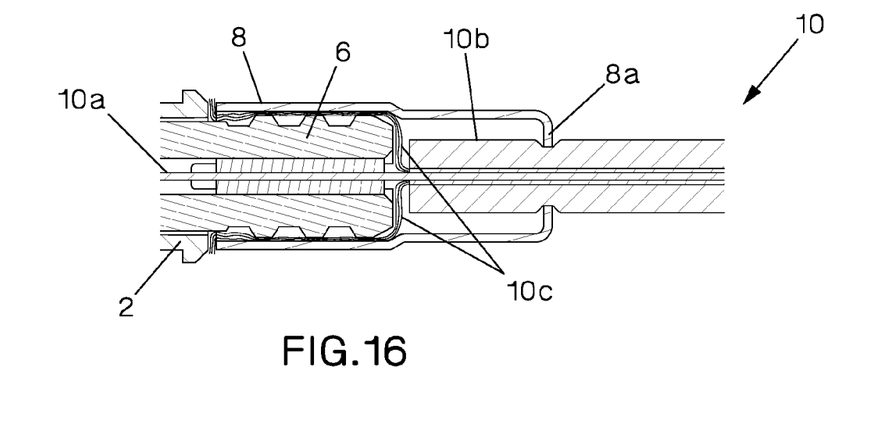
FIG. 16 shows a detailed cross sectional view of the crimp area according to another embodiment of the present invention.

Additional embodiments of the present invention can be used with a PCF cable constructed with aramid yarn 10c, as shown in FIG. 16. In one embodiment, the aramid yarn 10c is extended in between the backbone 6 and the crimp sleeve 8, and then secured by the crimp sleeve 8 as previously described. Securing the aramid yarn 10c to the backbone 6 of the connector may provide additional support for transferring forces placed on the fiber cable 10 to the connector 1 (or vice versa) without placing significant strain on the fiber 10a.

Figure 17:
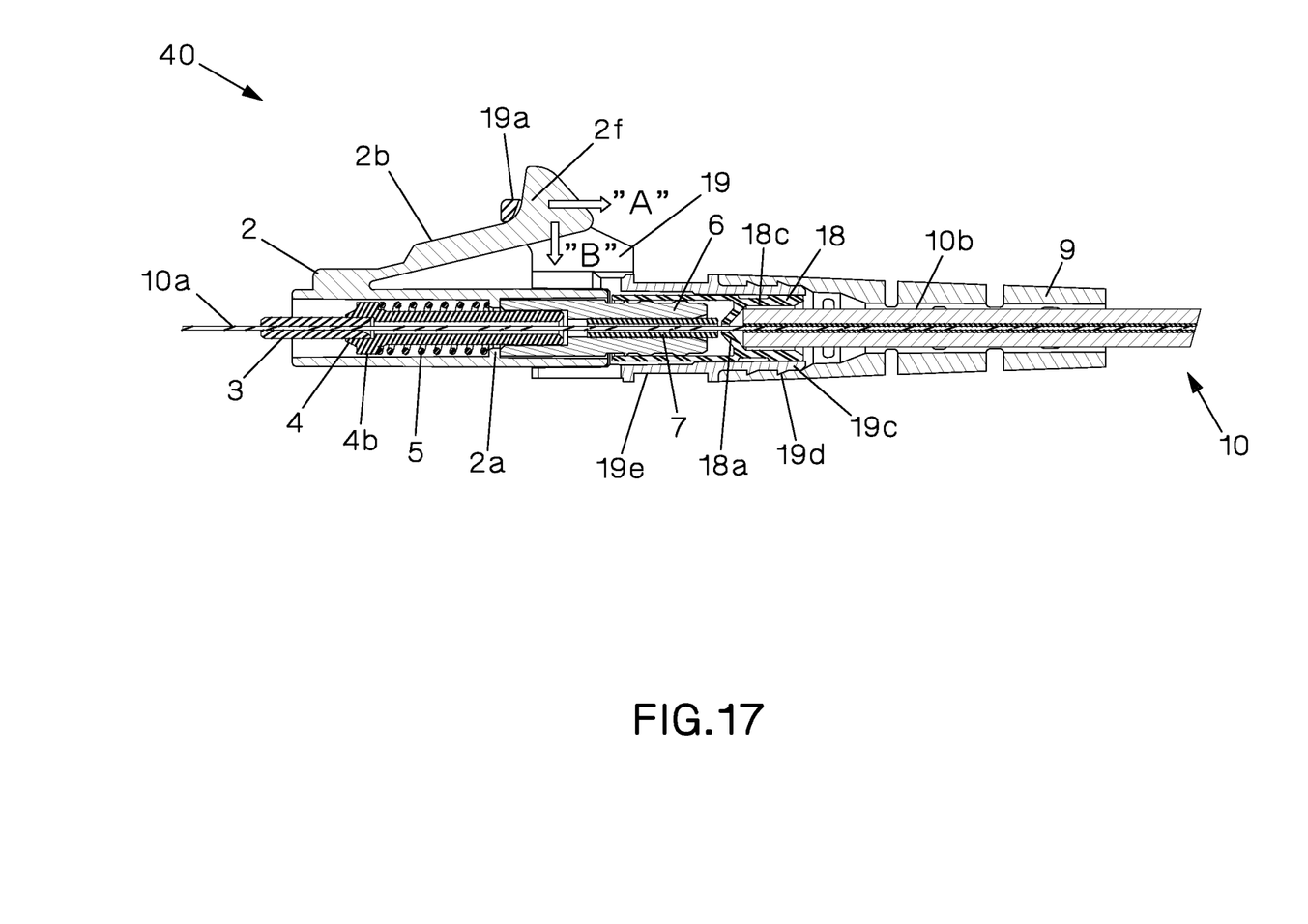
FIG. 17 shows a cross sectional view of a fiber optic connector according to still yet another embodiment of the present invention.
Figure 18:
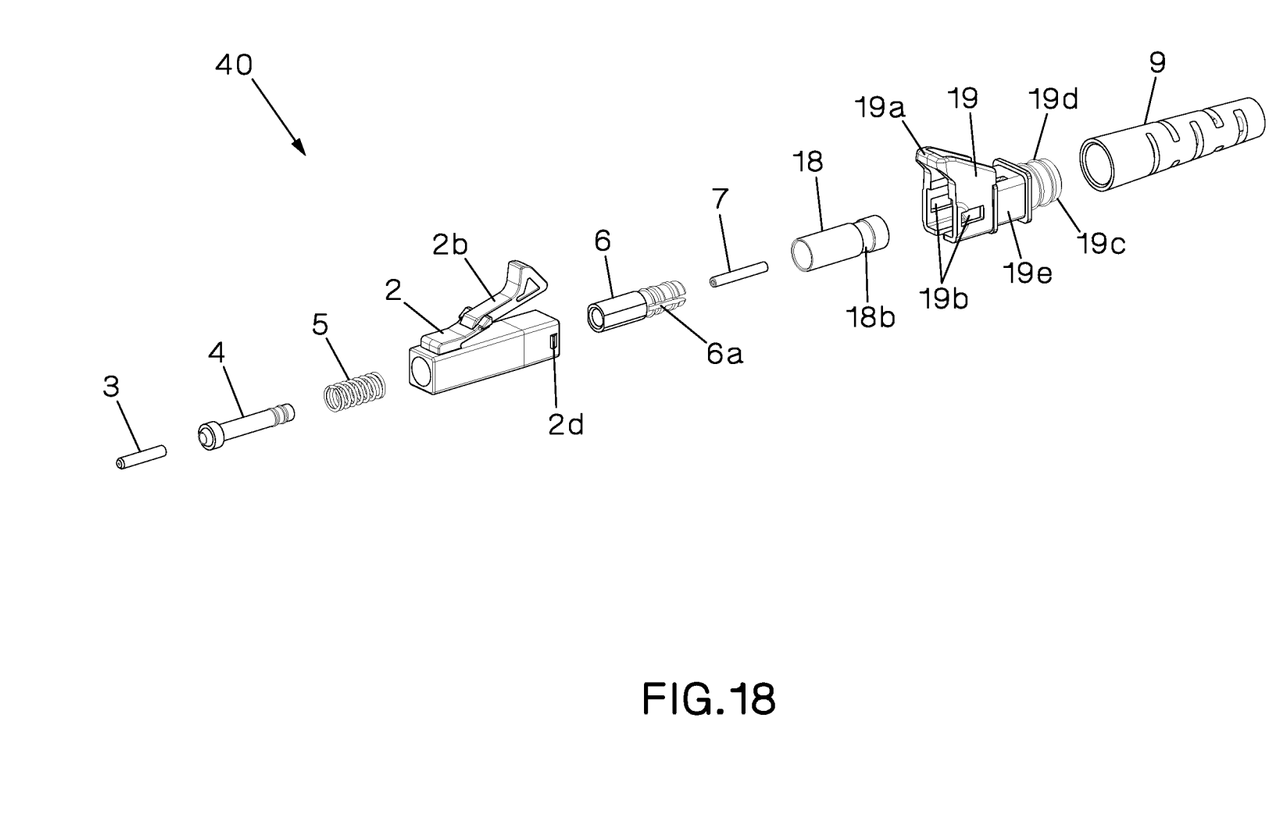
FIG. 18 shows an exploded isometric view of the fiber optic connector of FIG. 17

Another embodiment of the present invention is illustrated in FIGS. 17-20. Referring to FIGS. 17 and 18, the connector 40 comprises a first housing 2, a ferrule 3, a ferrule holder 4 with a ferrule holder flange 4b, a spring 5, a backbone 6, a micro-tube 7, a crimp sleeve 18 with a guiding feature 18a, a second housing 19, and a boot 9. The first housing 2 includes a retaining wall 2a, a catch(es) 2d, a connector latch 2b, and a ramp 2f. The second housing 19 includes a window(s) 19b, a boss 19c with retaining protrusions 19d, and a follower 19a. As will be explained later, in the presently described embodiment, the connector 40 may be considered a push-pull-grip connector or a manual disengagement connector.

The ferrule 3, ferrule holder 4, backbone 6, and micro-tube 7 are retained and biased forward within the first housing 2 in a manner that is similar to the previously described embodiment of FIG. 2. However, in the presently described embodiment the crimp sleeve 18 includes a guiding feature 18a positioned internally within the crimp sleeve 18. The guiding feature 18a can have a cone-like shape with an aperture in the center thereof. When the crimp sleeve 18 is positioned over the backbone 6, the guiding feature 18a helps guide the stripped fiber 10a into the micro-tube 7 during assembly of the connector 40. To help accomplish such guidance, the guiding feature 18a can be positioned at or near the micro-tube 7.

At least one potential advantage of having a guiding feature 18a in the crimp sleeve 18 is that during final assembly of the connector 40 with an optical fiber cable 10, the crimp sleeve 18 can remain on the backbone, reducing the number of components which have to be separated prior to final assembly. For example, when manufacturing the connector 40 the crimp sleeve 18 can be frictionally positioned over the backbone 6 (in an uncrimped state), allowing the crimp sleeve 18 to stay relatively secured to the already assembled front portion of the connector 40 which includes the first housing 2, ferrule 3, ferrule holder 4, spring 5, backbone 6, and the micro-tube 7. Such a configuration can allow the ultimate user to retain the crimp sleeve 18 in its manufacturer-installed position, potentially simplifying the assembly process.

Another potential advantage of having a guiding feature 18a in the crimp sleeve 18 is that the stripped fiber 10a is guided into the micro-tube 7 more precisely. This can help reduce the difficulty of threading a thin fiber 10a into the small aperture of the micro-tube 7 which can result in extended installation times and/or damage to the fiber 10a.

Referring to FIG. 18, the crimp sleeve 18 can include an identifier mark 18b on the outer surface thereof. Such an identifier mark can help identify the internal positioned of the guiding feature 18a and may be referenced during the manufacture of the connector 40.

The crimp sleeve 18 can also omit the lip 8a (see FIG. 2) of the previously describe embodiments. Rather than anchoring itself into the cable 10, the rear portion 18c of the crimp sleeve 18 can provide compressive force over a portion of the jacket 10b, where the amount of force is sufficient to provide frictional restraint of the fiber optic cable 10 relative to the crimp sleeve 18, thereby securing the cable 10 to the connector 40 for end-use.

Figure 6:
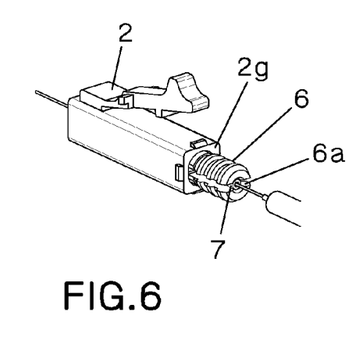
FIG. 6 shows an isometric view of a first housing, a backbone, and a micro-tube as used with the fiber optic connector of FIG. 2.
Figure 7:
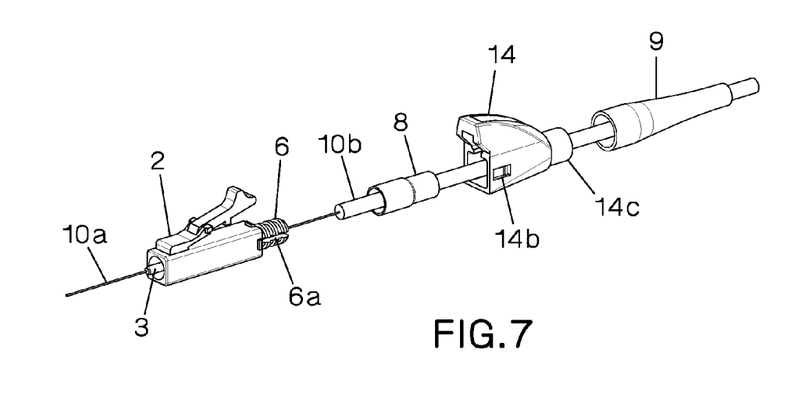
FIG. 7 shows a partially exploded isometric view of the fiber optic connector of FIG. 2.
Figure 8:
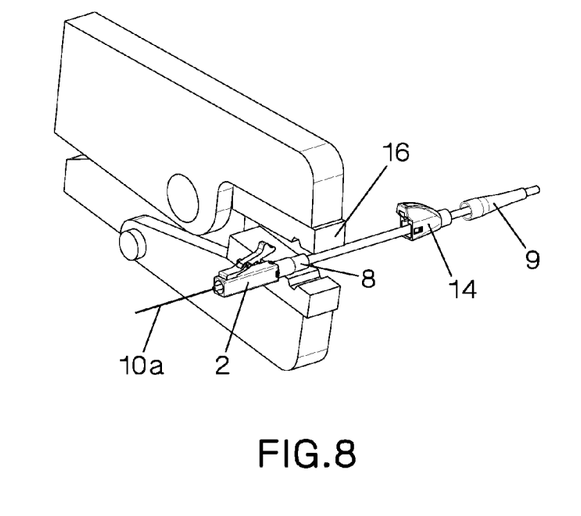
FIG. 8 shows an embodiment of a method of securing a crimp sleeve during the assembly of the fiber optic connector of FIG. 2.

With the exception of retaining the crimp sleeve 18 on the back bone 6, crimping of the crimp sleeve 18 may be achieved in a manner that is similar to the crimping shown and described in FIGS. 6-7. However, since the crimp sleeve 18 of the currently described embodiment includes a guiding feature 18a, the stripped fiber 10a is preferably inserted into the first housing until the non-stripped portion of the fiber cable 10 is in close proximity to or abuts the guiding feature 18a.

In an embodiment, the guiding feature 18 is made from a material sufficiently malleable such that upon crimping, the compression of the crimp sleeve 18 and the cone-like profile of the guiding feature 18a cause the guiding feature 18 to deform around the fiber 10a without appreciably damaging said fiber 10a.

In one embodiment the crimp sleeve 18 is crimped uniformly throughout its length. In another embodiment the crimp sleeve 18 is crimped only over the sections which overlay the backbone 6 and the cable buffer 10*b* (note FIG. 17 illustrates the connector 40 with the crimp sleeve 18 in an uncrimped state).

In the presently describe embodiment the first housing 2 includes a pronounced disengagement tab 2*g* which protrudes through the top opening within the second housing 19. The disengagement tab 2*g* should protrude sufficiently high over the second housing 19 where an end user may disengage the connector latch 2*b* from a corresponding receptacle by depressing the disengagement tab 2*g* in a downward direction. However, the connector 40 of the presently describe embodiment is not limited to push-down type of disengagement and may be disengaged from its operational position, by means of pulling on the second housing 19 and/or the boot 9. This can be achieved by pulling the second housing 19 in a generally rearward direction (see arrow "A" in FIG. 17), which results in relative motion between the second housing 19 and the first housing 2 until the follower 19*a* contacts the ramp 2*f*, and deflects the connector latch 2*b* in a generally downward direction (see arrow "B" in FIG. 17). The second housing 19 remains in contact with the first housing 2 by having the window(s) 19*b* trap the catch(es) 2*d* located on the first housing 2.

Figure 19:
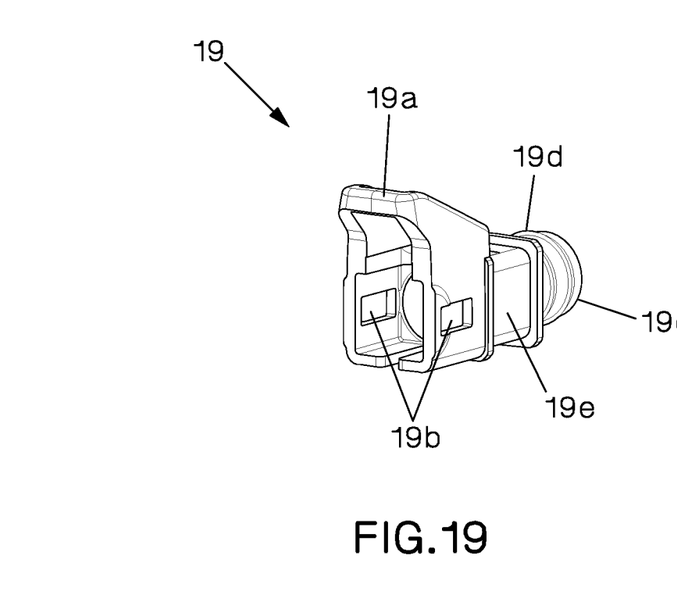
FIG. 19 shows an isometric view of a second housing as used with the fiber optic connector of FIG. 17.
Figure 20:
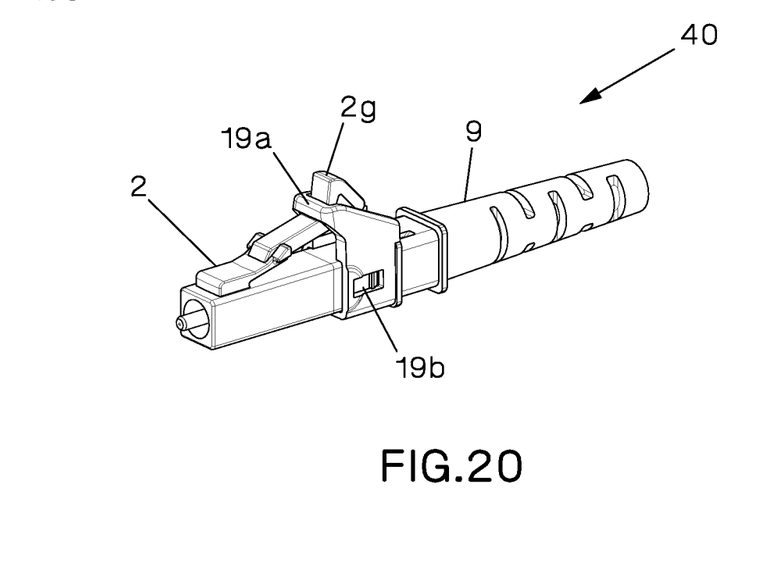
FIG. 20 shows an isometric view of an assembled fiber optic connector of FIG. 17.

The second housing 19 of the presently described embodiment also includes a boss 19*c* with retaining protrusions 19*d*. The boss 19*c* allows the boot 9 to fit tightly thereover, permitting both the second housing and the boot to move as a single unit. The retaining protrusions 19*d* may assist in securing the boot 9 to the boss 19*c* by anchoring themselves into the internal walls of the boot 9.

Lastly, the second housing 19 of the presently described embodiment also includes a recessed portion 19*e* which may be used to attach the connector 40 to a duplex clip (not shown).

It should be noted that while this invention has been described in terms of one or more embodiment(s), these embodiment(s) are non-limiting, and there are alterations, permutations, and equivalents, which fall within the scope of this invention. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A fiber optic cable connector comprising:
    a ferrule holder;
    a backbone;
    a spring disposed between at least a part of said ferrule holder and at least a part of said backbone;
    a micro-tube disposed at least partially within said backbone;
    a crimp sleeve having a lip, wherein at least a part of said crimp sleeve is disposed over said backbone;
    a first housing including a first housing cavity therein,
        wherein said ferrule holder is at least partially disposed within said first housing cavity; and
    a second housing including a second housing cavity therein, said second housing further including a top section,
        wherein said backbone is at least partially disposed within said second housing cavity;
    wherein at least a portion of said second housing is disposed over at least a portion of said first housing; and
    wherein said ferrule holder and said backbone exhibit united lateral movement in relation to said first and second housings.

2. The fiber optic cable connector of claim 1 further comprising a ferrule disposed at least partially within said ferrule holder.

3. The fiber optic cable connector of claim 2 wherein said ferrule is press-fit into said ferrule holder.

4. The fiber optic cable connector of claim 2 further comprising an optical fiber cable including a fiber, said fiber being disposed within said micro-tube, said backbone, said ferrule holder, and said ferrule.

5. The fiber optic cable connector of claim 4 wherein said fiber is a polymer coated optical fiber.

6. The fiber optic cable connector of claim 1 further comprising a boot.

7. The fiber optic cable connector of claim 1 wherein said ferrule holder is press-fit into said backbone.

8. The fiber optic cable connector of claim 1 wherein said micro-tube is made from a malleable material.

9. The fiber optic cable connector of claim 8 wherein said malleable material is selected from at least one of aluminum and aluminum alloys.

10. The fiber optic cable connector of claim 1 wherein said ferrule holder comprises a holder flange; wherein said first housing further comprises a retaining wall, said retaining wall being disposed between said backbone and said holder flange; and wherein said spring is disposed between said holder flange and said retaining wall.

11. The fiber optic cable connector of claim 1 wherein said lip is anchored to a jacket of an optical fiber cable.

12. The fiber optic cable connector of claim 11 wherein said ferrule holder, said backbone, said crimp sleeve, and said optical fiber cable exhibit united lateral movement in relation to said first and second housings.

13. The fiber optic cable connector of claim 11 wherein said optical fiber cable comprises aramid; and wherein at least a part of said aramid is disposed between at least a part of said crimp sleeve and at least a part of said backbone.

14. The fiber optic cable connector of claim 1 wherein said top section of said second housing has at least one of a push-pull-grip form, an anti-snag-grip form, and a slider form.

15. The fiber optic cable connector of claim 1 wherein said first housing exhibits lateral movement in relation to said second housings.

16. The fiber optic cable connector of claim 1 wherein said backbone comprises a slit.

17. The fiber optic cable connector of claim 1 wherein said first housing further comprises at least one catch; wherein said second housing further comprises at least one window for receiving said at least one catch; and wherein said first housing and said second housing remain in contact by having said at least one catch being trapped by said at least one window.

18. The fiber optic cable connector of claim 1 wherein said crimp sleeve comprises a hexagonal crimp.

19. A fiber optic cable connector comprising:
    a first housing having a first external surface and a first internal surface,
        said first internal surface defining a first cavity, said first internal surface further having a retaining wall,
    a second housing having a second external surface and a second internal surface,
        said second internal surface defining a second cavity;
    a ferrule holder having a ferrule holder flange, said ferrule holder disposed at least partially within said first cavity;
    a spring disposed between said ferrule holder flange and said retaining wall;

a ferrule at least partially disposed within said ferrule holder;

a backbone disposed at least partially within at least one of said first cavity and said second cavity, said backbone having at least one slit which allows at least a portion of said backbone to deform when subjected to pressure;

a micro-tube at least partially disposed within said backbone; and a crimp sleeve at least partially disposed over said backbone, said crimp sleeve including a guiding feature to guide a fiber of a fiber optic cable into said micro-tube.

20. The fiber optic cable connector of claim 19 further comprising a boot at least partially disposed over said second housing.

21. The fiber optic cable connector of claim 20 wherein said second housing includes at least one retaining protrusion adapter to retain said boot at least partially over said second housing.

22. The fiber optic cable connector of claim 19 wherein said ferrule is press-fit into said ferrule holder.

23. The fiber optic cable connector of claim 19 wherein said first external surface comprises a connector latch.

24. The fiber optic cable connector of claim 23 wherein said connector latch includes a ramp and said second housing includes a follower, said follower capable of deflecting said connector latch via said ramp.

25. The fiber optic cable connector of claim 19 further comprising a fiber optic cable including a fiber, said fiber being disposed within said micro-tube, said backbone, said ferrule holder, and said ferrule.

26. The fiber optic cable connector of claim 25 wherein said ferrule holder, said backbone, said crimp sleeve, and said fiber optic cable exhibit united lateral movement in relation to said first and second housings.

27. The fiber optic cable connector of claim 19 wherein said guiding feature comprises a cone-shaped structure, said cone-shaped structure having an aperture in a center thereof.

28. The fiber optic cable connector of claim 27 wherein said guiding feature deforms around said fiber of said fiber optic cable when said crimp sleeve is crimped.

29. The fiber optic cable connector of claim 19 wherein said ferrule holder is press-fit into said backbone.

30. The fiber optic cable connector of claim 19 wherein said micro-tube is made from a malleable material and wherein said malleable material is selected from at least one of aluminum and aluminum alloys.

31. The fiber optic cable connector of claim 19 wherein said first housing further comprises at least one catch; wherein said second housing further comprises at least one window for receiving said at least one catch; and wherein said first housing and said second housing remain in contact by having said at least one catch being trapped by said at least one window.

* * * * *